Nov. 9, 1943.    E. W. RIBLETT    2,334,033
PRODUCTION OF ALKYL HALIDES
Filed July 30, 1940
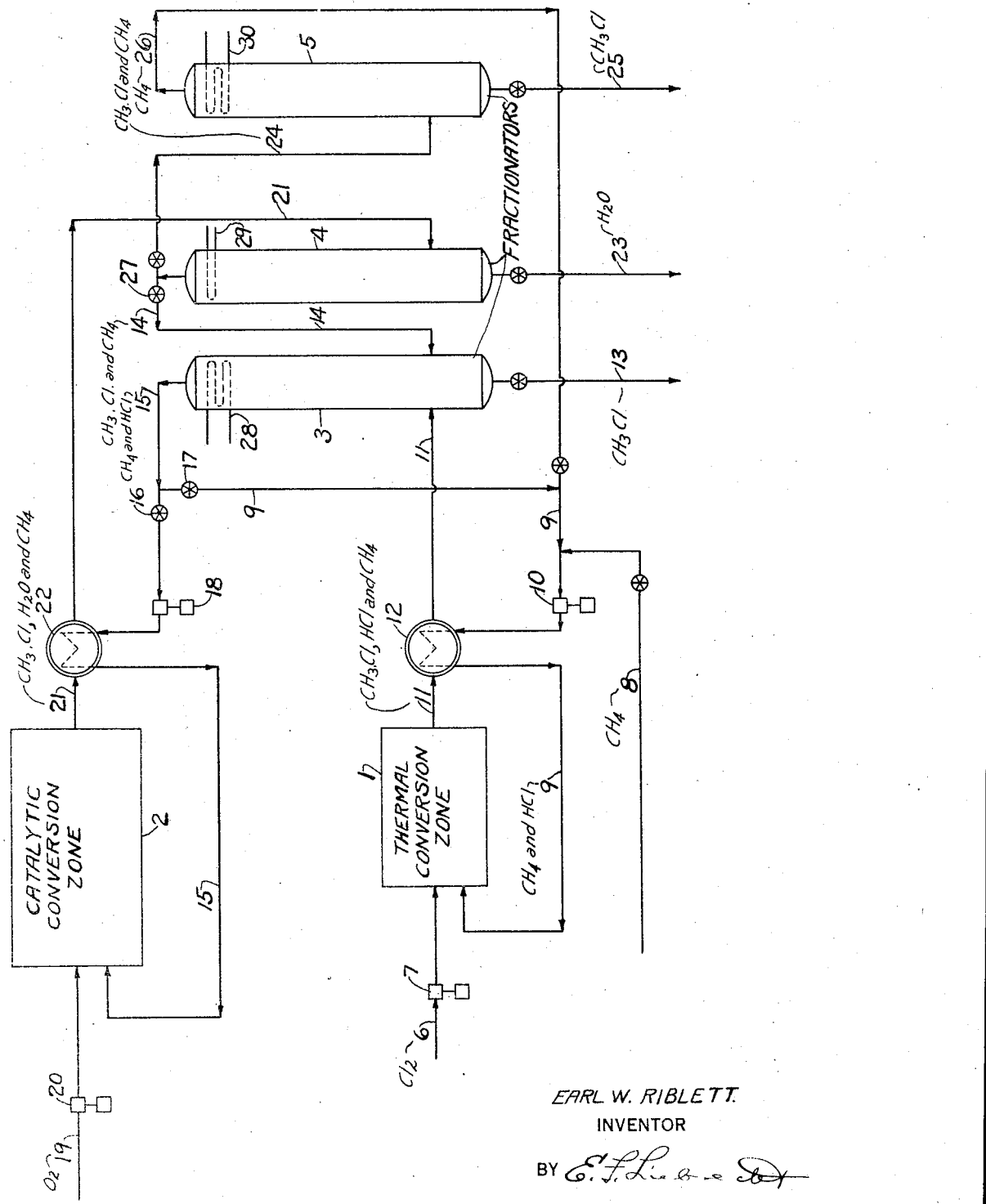
EARL W. RIBLETT
INVENTOR
BY
ATTORNEY.

Patented Nov. 9, 1943

2,334,033

UNITED STATES PATENT OFFICE 2,334,033

PRODUCTION OF ALKYL HALIDES

Earl W. Riblett, Tenafly, N. J., assignor to Process Management Company, Inc., of Wilmington, Del., a corporation of Delaware Application July 30, 1940, Serial No. 348,598

9 Claims. (Cl. 260—662)

This invention relates to improvements in the production of alkyl halides. More particularly, the invention relates to the reaction of chlorine or bromine with certain low molecular weight aliphatic hydrocarbons to effect conversion thereof to the corresponding alkyl halides. Still more particularly, the invention relates to the improvements in the reaction of chlorine and methane to produce methyl chloride.

In the improved process of the present invention, chlorine (or bromine) is reacted with a low molecular weight aliphatic hydrocarbon, such as methane, in a combination of steps whereby conversion of the halogen and hydrocarbon reactants to alkyl halides is effected under conditions of maximum efficiency. In the further explanation of the invention the reactants will be referred to as chlorine and methane but it is to be understood that reference to these specific reagents is merely for purposes of simplicity. Instead of chlorine, bromine may be employed, and low molecular weight aliphatic hydrocarbons other than methane may be employed, such as ethane.

In accordance with the new process the reaction is carried out in two separate zones. In one zone, chlorine and an excess of methane are reacted at a relatively high temperature and for a relatively short time to effect thermal conversion of the chlorine to methyl chloride and hydrogen chloride. These products are fractionated to separate the methyl chloride. The hydrogen chloride and the unconverted methane are reacted in another conversion zone wherein methane, hydrogen chloride and oxygen are reacted in the presence of a suitable catalyst at a relatively lower temperature and for a substantially longer reaction time to effect conversion of the hydrogen chloride and a portion of the methane to methyl chloride and water. Unconverted methane from this catalytic conversion zone may be separated and recycled to the thermal conversion zone for reaction with fresh supplies of chlorine.

In accordance with one modification of the invention the products of both the thermal and the catalytic conversion treatments, after removal of water produced in the catalytic conversion treatment, are fractionated in a single zone to separate the methyl chloride produced in the two conversion zones as the product of the process. The remaining mixture of unconverted methane and hydrogen chloride is then recycled in part to each of the conversion zones. Preferably a major proportion of this mixture is recycled to the catalytic conversion zone and the remaining minor proportion is recycled to the thermal conversion zone. In dividing this mixture for recycling it is advantageous to recycle to the catalytic conversion operation a quantity of the mixture containing a volume of hydrogen chloride equal to the volume of chlorine charged to the thermal conversion operation. The remaining minor proportion of this mixture may then be recycled to the thermal conversion zone to assist in maintaining in that zone the excess of methane which should be maintained in relation to the quantity of chlorine charged thereto.

In accordance with a second modification of the invention, the conversion products of the thermal and catalytic conversion zones are separately fractionated. In accordance with this modification the products of the thermal conversion treatment are fractionated to separate methyl chloride and all of the remaining mixture of unconverted methane and hydrogen chloride is passed to the catalytic conversion treatment as the charge therefor in admixture with oxygen from an external source. The product from the catalytic conversion zone is then separately fractionated to remove water and methyl chloride and the remaining unconverted methane is recycled in its entirety to the thermal conversion zone.

The first modification of the invention described above is preferable in view of the fact that the separate fractionation treatments in the second modification require more extensive equipment and involve more complicated operations, which render it less desirable from an economic point of view. Furthermore, the presence of hydrogen chloride in the charge to the thermal conversion zone appears to assist the reaction therein.

The invention will be described in more detail by a reference to specific modifications which are illustrated in the flow diagram shown in the accompanying drawing. The specific modifications illustrated in the drawing will be referred to for purposes of illustration, but it is understood that the invention is not limited by reference to such specific modifications but is capable of other modifications which may be beyond the scope of the flow diagram shown in the drawing.

In the drawing the apparatus shown diagrammatically includes a thermal conversion zone 1 and a catalytic conversion zone 2. The products of these conversion zones preferably are fractionated together in fractionator 3. A fractionator 4 or other suitable separating means is provided for separating water from the product of catalytic conversion zone 2. A third fractionator 5 may be provided in order to effect fractionation of the products from the thermal conversion zone 2 in a zone separate from that in which fractionation of the products of thermal conversion zone 1 is carried out.

In the operation of the preferred modification of the invention, chlorine is introduced into thermal conversion zone 1 through line 6 provided with a pump 7. Methane is introduced into the process through line 8 which connects with line 9. In line 9 the methane introduced through line 8 is mixed with additional methane, and accompanying hydrogen chloride, being recycled to thermal conversion zone 1. Line 9 is provided with a pump 10 by means of which the methane and accompanying hydrogen chloride are passed to the entrance of thermal conversion zone 1.

In thermal conversion zone 1 the reactants are subjected to a high temperature in the range of 1000–1800° F. When the object is to produce methyl chloride as the major product a temperature of about 1500° F. and a contact time of the order of 0.01 second is preferable. It has been found possible to use a lower temperature and a longer time to effect the conversion but this has usually resulted in higher yields of secondary, tertiary, and quarternary chlorinated products at the expense of a decreased yield of methyl chloride. Carbon tetrachloride or either of the other two intermediate chlorinated products may be made the chief product by suitable selection of time of contact and temperature together with an increased amount of chlorine relative to methane.

Under the conditions specified, 1500° F. and 0.01 second time of contact, practically complete conversion of the chlorine to methyl chloride and hydrogen chloride is effected. The hot reaction products are withdrawn from thermal conversion zone 1 through line 11 and are cooled, for example, by passage through heat exchanger 12 wherein they contact indirectly the incoming fresh feed to the reaction, and by other suitable cooling means not shown, to effect condensation of methyl chloride from hydrogen chloride and unreacted methane. Line 11 connects with fractionator 3 whereby the cooled reaction products are introduced into fractionator 3 to effect substantially complete separation therein of methyl chloride from hydrogen chloride and unconverted methane. The methyl chloride is collected in liquid form in the lower portion of fractionator 3 and may be withdrawn therefrom through line 13. Additional quantities of methyl chloride and unconverted methane are introduced into fractionator 3 through line 14 from a source to be described below. The material introduced into fractionator 3 through line 14 is fractionated along with the material introduced through line 11 and the combined methyl chloride product from both sources is withdrawn through line 13.

The mixture of unconverted methane and hydrogen chloride is withdrawn overhead from fractionator 3 through line 15 which connects with the entrance of catalytic conversion zone 2. Line 15 connects also with line 9. By suitable manipulation of valve 16 in line 15 and valve 17 in line 9 the mixture of hydrogen chloride and methane withdrawn from fractionator 3 through line 15 may be apportioned as desired between thermal conversion zone 1 and catalytic conversion zone 2. As stated above, preferably this apportionment should be controlled to send to the entrance of catalytic conversion zone 2, through line 15, an amount of this mixture of reagents which contains a volume of hydrogen chloride equal to the volume of chlorine introduced through line 6.

The portion of the mixture of methane and hydrogen chloride to be charged to the catalytic conversion zone 2 is transferred thereto by means of a pump 18 located in line 15. Oxygen is introduced into catalytic conversion zone 2 through line 19 provided with pump 20 for reaction with methane and hydrogen chloride in zone 2.

In catalytic conversion zone 2 the reactants are subjected to the action of a suitable catalyst at a temperature of 600–1000° F., preferably about 800° F. for a time sufficient to provide a reaction time of the order of 20 to 100 seconds, preferably approximately 50 seconds, for the production of methyl chloride. Under these conditions there is effected almost complete conversion of the hydrogen chloride largely to methyl chloride and water by reaction thereof with oxygen and methane.

Catalysts suitable for use in conversion zone 2 include a wide variety of mixed metallic oxides and chlorides, preferably on porous supports. Among the metals found suitable are titanium, zirconium, cerium, thorium, copper and silver. Efficacious supports are kieselguhr, silica gel, activated alumina, alumina gel and pumice. From an economic standpoint, the combinations of cerium and pumice and of copper and pumice are preferable and may be made by simply soaking the pumice in a solution of the metal chlorides or agitating the pumice with a partially precipitated metallic salt and hydroxide suspension, followed by drying.

The reaction products are withdrawn from catalytic conversion zone 2 through line 21 and after suitable cooling, for example, by contact with the incoming charge in heat exchanger 22, are introduced into fractionator 4 or other suitable means for effecting separation of water from the reaction products. In fractionator 4 water is condensed and separated and may be withdrawn therefrom through line 23. The water withdrawn through line 23 may be treated in a separator, not shown, to extract methyl chloride which may be dissolved therein. The remaining mixture of methyl chloride and unconverted methane is then withdrawn from the upper portion of fractionator 4 through line 14 and transferred to fractionator 3 for fractionation therein, as described above.

In accordance with another modification of the invention, a separate fractionator 5 may be provided for treatment of the products from the catalytic conversion zone 2. According to this modification all or substantially all of the mixture of methyl chloride and unconverted methane withdrawn from fractionator 4 through line 14 is diverted through line 24 and transferred thereby to fractionator 5. In fractionator 5 conditions of fractionation similar to those obtaining in fractionator 3 are maintained whereby methyl chloride is separated as a condensate and withdrawn through line 25. Unconverted methane is separated as a gas and withdrawn overhead from fractionator 5 through line 26. Line 26 connects with line 9 whereby the methane from fractionator 5 may be recycled directly to thermal conversion zone 1. In accordance with this modification, valve 17 preferably would be closed and valve 27 in line 14 would be employed to restrict or prevent the transfer of material from fractionator 4 directly to fractionator 3.

Preferably the quantities of reagents charged to the conversion zones should be regulated to provide for a preponderance of methane to the other reagents. Advantageously the proportions of reagents charged to thermal conversion zone 1 should be regulated to produce therein a molecular ratio of methane to chlorine which is approximately 5:1. Advantageously also the molecular ratio of methane to hydrogen chloride in conversion zone 2 may be maintained at approximately 4:1.

A distinct advantage has also been found in having some hydrogen chloride in the thermal conversion zone 1 in accordance with the preferred modification. The presence of the hydrogen chloride seems to effect a speeding up of the reaction and at the same time (possibly as a consequence) favors the selective production of methyl chloride at the expense of reduced yields of the more highly chlorinated methanes. Other gases, particularly hydrogen, have shown a similar effect.

Fractionators 3, 4 and 5 may be provided with suitable cooling means 28, 29 and 30, respectively, in the upper portions thereof to maintain the desired fractionating conditions.

An illustration of the operation of the invention in accordance with the preferred modification for the production of methyl chloride from chlorine and methane is indicated in the following table, which is based on the treatment of 1,000,000 cubic feet of methane per day. Under optimum conditions conversion of about 90% of the methane and chlorine is possible. This illustration therefore provides for the production of approximately 127,000 pounds of methyl chloride per day. However, in the table the quantities of materials flowing to and from various parts of the process are based on 100% recovery of the chlorine reacted as methyl chloride, small losses and the production of higher chlorinated methanes and higher chlorinated hydrocarbons being ignored to simplify presentation of the subject matter. In the table the figures represent cubic feet per second and the composition of the materials entering and leaving each phase of the process is indicated.

of other alkyl chlorides and alkyl bromides and it is capable of other modifications involving reaction conditions particularly adapted for the treatment of other reagents.

I claim:

1. A process for the production of alkyl halides which comprises heating a halogen selected from the group consisting of chlorine and bromine, in the presence of an excess of low-boiling paraffin hydrocarbons, to effect thermal conversion of said halogen to alkyl halides and hydrogen halide, fractionating the products of said thermal conversion operation to separate the alkyl halides contained therein from hydrogen halide and unconverted low-boiling paraffin hydrocarbons, contacting at least a portion of said hydrogen halide and said unconverted low-boiling paraffin hydrocarbons with oxygen in the presence of a catalyst at elevated temperature to effect conversion of said hydrogen halide to alkyl halides and water, fractionating the products of said catalytic conversion operation to separate therefrom water and alkyl halides, and recycling unconverted low-boiling paraffin hydrocarbons contained in the products of said catalytic conversion operation to said thermal conversion operation.

2. A process for the production of alkyl halides which comprises heating a halogen, selected from the group consisting of chlorine and bromide, in the presence of an excess of low-boiling paraffin hydrocarbons, to effect thermal conversion of said halogen to alkyl halides and hydrogen halide, separately subjecting a mixture of said hydrogen halide and low-boiling paraffin hydrocarbons to contact with oxygen in the presence of a catalyst at elevated temperature to effect conversion of said hydrogen halide to alkyl halides and water, fractionating the products of said thermal conversion operation and said catalytic conversion operation to separate therefrom alkyl halides, water, and a mixture of hydrogen halide and unconverted low-boiling paraffin hydrocarbons, recycling a major proportion of said mixture to said catalytic conversion operation, and recycling the remaining minor portion of said mixture to said thermal conversion operation.

3. A process in accordance with claim 2 where-

*Table*

| | Entering | | | | | | Leaving | | | |
|---|---|---|---|---|---|---|---|---|---|---|
| | $CH_4$ | $Cl_2$ | $O_2$ | HCl | $CH_3Cl$ | $H_2O$ | $CH_4$ | HCl | $CH_3Cl$ | $H_2O$ |
| Fresh feed (lines 6, 8, 19) | 11.57 | 5.79 | 2.89 | | | | | | | |
| Zone 1 | 28.92 | 5.79 | | 4.34 | | | 23.14 | 10.13 | 5.79 | |
| Zone 2 | 23.14 | | 2.89 | 5.79 | | | 17.36 | | 5.79 | 5.79 |
| Fractionator 3 | 40.50 | | | 10.13 | 11.57 | | 40.50 | 10.13 | | |
| Fractionator 4 | 17.36 | | | | 5.79 | 5.79 | 17.36 | | 5.79 | |

In each conversion zone the heat available at heat exchanger 12 and heat exchanger 22, and the heat of reaction are more than sufficient to provide the heat necessary to heat the gas. The amount of external heat necessary to maintain the process is, therefore, quite small.

The improved process as described above provides an efficient and economic method of effecting the conversion of low molecular aliphatic hydrocarbons such as methane to alkyl chloride or alkyl bromide. The foregoing illustration refers specifically to the production of methyl chloride. It should be understood, however, that the invention is capable of application to the production in the said mixture of hydrogen halide and unconverted low-boiling paraffin hydrocarbons is charged to said catalytic conversion zone in an amount whereby the molecules of hydrogen halide charged to said catalytic conversion operation equal the molecules of halogen charged to said thermal conversion operation.

4. A process for the production of methyl chloride which comprises heating chlorine in the presence of an excess of methane to effect thermal conversion of said chlorine to methyl chloride and hydrogen chloride, separately contacting hydrogen chloride and methane with oxygen in the presence of a catalyst at elevated temperature to effect conversion of said hydrogen chloride to methyl chloride and water, fractionating the products of said conversion operations to separate therefrom methyl chloride, water and a mixture of hydrogen chloride and unconverted methane, recycling a major proportion of said mixture of hydrogen chloride and methane to said catalytic conversion operation as the charge therefor, and recycling the remaining minor proportion of said mixture to said thermal conversion operation as a portion of the charge therefor.

5. A process in accordance with claim 4 wherein the molecular ratio of methane to chlorine charged to said thermal conversion operation is approximately 5 to 1.

6. A process in accordance with claim 4 wherein the molecular ratio of methane to hydrogen chloride charged to the catalytic conversion operation is approximately 4 to 1.

7. A process in accordance with claim 4 wherein the thermal conversion operation is effected at approximately 1500° F. and a relatively short reaction time, and the catalytic conversion operation is effected at approximately 800° F. with a relatively long reaction time.

8. A process for the production of methyl chloride which comprises heating chlorine in the presence of an excess of methane to effect thermal conversion of said chlorine to methyl chloride and hydrogen chloride, separately contacting hydrogen chloride and methane with oxygen in the presence of a catalyst at elevated temperature to effect conversion of said hydrogen chloride to methyl chloride and water, fractionating the products of said conversion operations in a common zone to separate therefrom water, methyl chloride and a mixture of hydrogen chloride and unconverted methane, recycling to the catalytic conversion operation as the charge therefor a portion of said mixture of hydrogen chloride and methane containing a volume of hydrogen chloride equal to the volume of chlorine charged to the thermal conversion operation, and recycling the remaining portion of said mixture of hydrogen chloride and methane to the thermal conversion operation.

9. A process for the production of alkyl halides which comprises heating a halogen from the group consisting of chlorine and bromine in the presence of an excess of low-boiling paraffin hydrocarbons to effect thermal conversion of said halogen to alkyl halides and hydrogen halide, simultaneously in a separate zone contacting hydrogen halide produced in said thermal conversion operation and unconverted low-boiling paraffin hydrocarbons with oxygen in the presence of a catalyst at elevated temperature to effect conversion of the said hydrogen halide to alkyl halides and water, fractionating the products of said conversion operations to separate water and alkyl halides from hydrogen halide and unconverted low-boiling paraffin hydrocarbons, passing hydrogen halide thus separated and at least a portion of the unconverted low-boiling paraffin hydrocarbons thus separated to the catalytic conversion reaction as the charge therefor, and recycling the remaining unconverted low-boiling paraffin hydrocarbons to the thermal conversion operation.

EARL W. RIBLETT.

CERTIFICATE OF CORRECTION.

Patent No. 2,334,033. November 9, 1943.

EARL W. RIBLETT.

It is hereby certified that error appears in the printed specification of the above numbered patent requiring correction as follows: Page 3, second column, line 30, claim 2, for "bromide" read --bromine--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.